United States Patent
Yoneda et al.

(10) Patent No.: US 8,586,687 B2
(45) Date of Patent: Nov. 19, 2013

(54) POLYALKYLENE GLYCOL-BASED POLYMER AND PROCESS FOR PRODUCING THE SAME

(75) Inventors: Atsuro Yoneda, Osaka (JP); Akiko Hemmi, Osaka (JP); Sachiko Nakanishi, Osaka (JP); Daisuke Michitaka, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 39 days.

(21) Appl. No.: 12/971,416

(22) Filed: Dec. 17, 2010

(65) Prior Publication Data

US 2012/0157655 A1 Jun. 21, 2012

(51) Int. Cl.
*C08F 216/20* (2006.01)
(52) U.S. Cl.
USPC ............ 526/333; 510/276; 526/90; 526/223; 526/229; 526/318.5; 528/271; 528/425
(58) Field of Classification Search
USPC ......... 510/276; 526/90, 223, 229, 318.5, 333; 528/271, 425
See application file for complete search history.

(56) References Cited

U.S. PATENT DOCUMENTS

| | | | |
|---|---|---|---|
| 6,391,923 B1 * | 5/2002 | Pollmann et al. | 514/714 |
| 2002/0049147 A1 | 4/2002 | Saeki et al. | |
| 2003/0125492 A1 * | 7/2003 | Yamamoto et al. | 526/318.2 |
| 2003/0158361 A1 | 8/2003 | Yoneda et al. | |
| 2005/0080298 A1 * | 4/2005 | Inaoka et al. | 568/679 |
| 2006/0004162 A1 | 1/2006 | Yoneda et al. | |
| 2007/0004885 A1 | 1/2007 | Yoneda et al. | |

FOREIGN PATENT DOCUMENTS

| | | |
|---|---|---|
| JP | 62-86098 | 4/1987 |
| JP | 62-068806 | 9/1994 |
| JP | 2002-60785 | 9/2003 |
| JP | 2004-75977 | 9/2005 |

* cited by examiner

*Primary Examiner* — Richard A Huhn
(74) *Attorney, Agent, or Firm* — Novak Druce Connolly Bove + Quigg LLP

(57) ABSTRACT

The present invention has an object to provide a polyalkylene glycol-based polymer having high anti-soil redeposition ability in washing treatment and having high compatibility with surfactants. The polyalkylene glycol-based polymer includes: a structure unit (a) derived from a polyalkylene glycol-based monomer (A) of a specific structure, and a structure unit (b) derived from a carboxyl group-containing monomer (B) at specific ratios.

10 Claims, No Drawings

POLYALKYLENE GLYCOL-BASED POLYMER AND PROCESS FOR PRODUCING THE SAME

TECHNICAL FIELD

The present invention relates to a polyalkylene glycol-based polymer and a process for producing the same, and more specifically to a polyalkylene glycol-based polymer useful as a raw material for detergent additives and the like and a process for producing the same.

BACKGROUND ART

Polyalkylene glycol-based polymers are useful polymers used in various industrial fields, and have high performance when used, for example, in dispersants, detergent compositions, and the like in aqueous environment. In the case that polyalkylene glycol-based polymers are used in aqueous environment, several influential factors such as the quality of water to be used and the interaction with other materials used in combination should be considered. Specifically, the hardness of water is different among countries or regions, and some of polyalkylene glycol-based polymers that produce various effects in aqueous environment with low water hardness may not produce sufficient effects in aqueous environment with high water hardness. When used, for example, in a detergent composition containing a surfactant, some polyalkylene glycol-based polymers may not have sufficient washing performance depending on the degree of the interaction with the surfactant.

Examples of conventional polyalkylene glycol-based polymers include copolymers produced from 40 to 99.5 mol % of a specific unsaturated carboxylic acid-based monomer, 0.5 to 60 mol % of an unsaturated alcohol-based monomer represented by the formula (P-1), and 0 to 40 mol % of a monomer copolymerizable with these monomers (see Patent Document 1). Patent Document 1 teaches that these copolymers have high ability to disperse carbon black and the chelate effect and therefore can be used as detergent builders.

[Chem. 1]

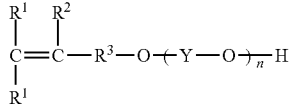

(P-1)

In the formula, $R^1$ and $R^2$ independently represent H or a methyl group, and at least one of $R^1$ and $R^2$ is not a methyl group; $R^3$ represents $—CH_2—$, $—(CH_2)_2—$, or $—C(CH_3)_2—$; the total sum of the numbers of carbons in $R^1$, $R^2$, and $R^3$ is 3; Y represents $C_{2-3}$ alkylene group; and n is an integer of from 0 to 100. The copolymers are known to be suitable as dispersants for satin white (calcium sulfoaluminate hexahydrate) (see Patent Document 2).

Other examples of conventional polyalkylene glycol-based copolymers include soluble copolymers obtained by copolymerizing monomer materials essentially containing a specific unsaturated carboxylic acid-based monomer and an unsaturated alcohol-based monomer represented by the formula (P-2) (see Patent Document 3). Patent Document 3 teaches that these copolymers are suitably used in liquid detergent compositions because of their excellent washing performance such as high anti-soil redeposition ability and compatibility with surfactants.

[Chem. 2]

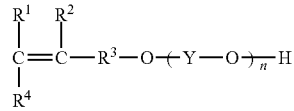

(P-2)

In the formula, $R^1$, $R^2$, and $R^4$ independently represent H or a methyl group, and at least one of $R^1$ (or $R^4$) and $R^2$ is not a methyl group; $R^3$ represents $—CH_2—$, $—(CH_2)_2—$, or $—C(CH_3)_2—$; the total sum of the numbers of carbons in $R^1$, $R^2$, $R^3$, and $R^4$ is 3; Y represents a $C_{2-18}$ alkylene group; and n is an integer of from 1 to 300.

In addition, polyalkylene glycol-based polymer compositions are disclosed (see Patent Document 4). These polyalkylene glycol-based polymer compositions have a sulfur oxoacid group at an end and are prepared by copolymerizing a (meth)acrylic acid-based monomer, an unsaturated polyalkylene glycol-based monomer having 6 to 300 polyalkylene oxide repeating units, and a monoethylenic unsaturated monomer copolymerizable with these monomers, and have an introduced sulfur amount S ((amount of S in polymer)/(total S amount)×100) of not less than 3. Patent Document 4 teaches that these polymer compositions are excellent in the calcium capturing ability, clay dispersibility, and anti-gelling property and therefore can be suitably used as detergent builders and the like.

CITATION LIST

Patent Document

Patent Document 1: Japanese Patent Publication (Kokai) No. S62-86098
Patent Document 2: Japanese Patent Publication (Kokai) No. S62-68806
Patent Document 3: Japanese Patent Publication (Kokai) No. 2002-060785
Patent Document 4: Japanese Patent Publication (Kokai) No. 2004-75977

SUMMARY OF THE INVENTION

Problems to be Solved by the Invention

As described above, polyalkylene glycol-based polymers of various structures are under examination.

Now, there is a water saving trend in washing treatment (e.g. use of used water in bathtub for washing treatment) with recent growing concern of consumers for environmental problems. The use of used water in bathtub for washing treatment has disadvantages such as attachment of soil components in the water to fibers in washing treatment, and condensed hardening components in the water caused by heating the water several times. Therefore, the required level of performance of preventing soil components from reattaching to fibers (referred to as anti-soil redeposition ability) in washing treatment using water with a higher hardness is much higher than before. Nowadays, concentrated liquid detergents whose surfactant content is not less than 50% are becoming popular among liquid detergents. This trend in turn has created a demand for detergent additives suitably used in such concentrated liquid detergents, that is, detergent additives with higher solubility with surfactants than conventional ones.

Conventional polyalkylene glycol-based polymers, however, do not sufficiently meet the recent needs, that is, high performance levels in aqueous environment and should be further revised so that polymers that meet the recent needs and are suitably used as higher-performance detergent additives are provided.

Considering the above-described background, the present invention aims to provide a polyalkylene glycol-based polymer having high compatibility with surfactants as well as high anti-soil redeposition ability in washing treatment, and a process for producing the same.

Means for Solving the Problems

The present inventor examined polymers suitably used as detergent additives and the like. The examination revealed that a polyalkylene glycol-based polymer having a structure unit derived from a polyalkylene glycol-based monomer having a specific structure and a structure unit derived from a carboxyl group-containing monomer has high compatibility with surfactants and strikingly high anti-soil redeposition ability even in water with high hardness. Furthermore, the present inventor found that a polymer containing the structure units at levels adjusted within a specific range has more improved performance, and that such a polymer is suitably used as a detergent additive that meets the recent needs. Thus, the present inventor found a way to solve the above-described problems and completed the present invention.

Specifically, the present invention provides a polyalkylene glycol-based polymer including: a structure unit (a) derived from a polyalkylene glycol-based monomer (A); and a structure unit (b) derived from a carboxyl group-containing monomer (B). The polyalkylene glycol-based monomer (A) is represented by the formula (1):

[Chem. 3]

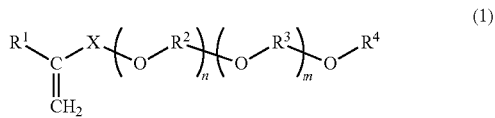

(1)

wherein $R^1$ represents H or a methyl group; X represents a methylene group, an ethylene group, or a direct bond; n represents an average addition number of moles of an oxyalkylene group ($-R^2-O-$), and is from 1 to 300; $R^2$ represents a $C_{2-20}$ alkylene group, and each of $R^2$s may be the same as or different from each other; m represents an average addition number of moles of an oxyalkylene group ($-R^3-O-$), and is from 1 to 20; $R^3$ represents a $C_{3-4}$ alkylene group, and each of $R^3$s may be the same as or different from each other; and $R^4$ represents H, a $C_{1-24}$ alkyl group, or a $C_{6-24}$ aryl group. In the polyalkylene glycol-based polymer, the structure unit (a) is present at a level of from 1 to 90% by mass based on 100% by mass of all structure units derived from all monomers in the polymer, and the structure unit (b) is present at a level of from 10 to 99% by mass based on 100% by mass of all the structure units derived from all the monomers in the polymer.

Another aspect of the present invention is a process for producing a polyalkylene glycol-based polymer, including polymerizing a polyalkylene glycol-based monomer (A) and a carboxyl group-containing monomer (B). The polyalkylene glycol-based monomer (A) is represented by the formula (1):

[Chem. 4]

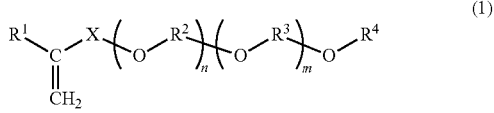

(1)

wherein $R^1$ represents H or a methyl group; X represents a methylene group, an ethylene group, or a direct bond; n represents an average addition number of moles of an oxyalkylene group ($-R^2-O-$), and is from 1 to 300; $R^2$ represents a $C_{2-20}$ alkylene group, and each of $R^2$s may be the same as or different from each other; m represents an average addition number of moles of an oxyalkylene group ($-R^3-O-$), and is from 1 to 20; $R^3$ represents a $C_{3-4}$ alkylene group, and each of $R^3$s may be the same as or different from each other; and $R^4$ represents H, a $C_{1-24}$ alkyl group, or a $C_{6-24}$ aryl group. In the process for producing a polyalkylene glycol-based polymer, the polyalkylene glycol-based monomer (A) is added at a level of from 1 to 90% by mass based on 100% by mass of all monomers to be added, and the carboxyl group-containing monomer (B) is added at a level of from 10 to 99% by mass based on 100% by mass of all the monomers to be added.

Hereinafter, the present invention is described in more detail.
(Polyalkylene Glycol-Based Polymer of the Present Invention)
<Polyalkylene Glycol-Based Monomer (A)>

The polyalkylene glycol-based polymer of the present invention (also referred to as polymer of the present invention) is a polymer essentially containing the structure unit (a) derived from the polyalkylene glycol-based monomer (A). The polyalkylene glycol-based monomer (A) is represented by the formula (1):

[Chem. 5]

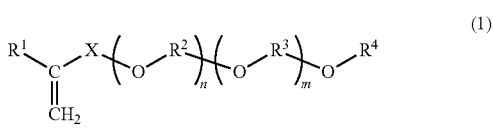

(1)

wherein $R^1$ represents H or a methyl group; X represents a methylene group, an ethylene group, or a direct bond; n represents an average addition number of moles of the oxyalkylene group ($-R^2-O-$), and is from 1 to 300; $R^2$ represents a $C_{2-20}$ alkylene group, and each of $R^2$s may be the same as or different from each other; m represents an average addition number of moles of the oxyalkylene group ($-R^3-O-$), and is from 1 to 20; $R^3$ represents a $C_{3-4}$ alkylene group, and each of $R^3$s may be the same as or different from each other; and $R^4$ represents H, a $C_{1-24}$ alkyl group, or a $C_{6-24}$ aryl group. The structure of the polyalkylene glycol-based monomer (A) shown above constitutes a $C_{3-4}$ oxyalkylene group near the end of a side chain in the polyalkylene glycol-based polymer of the present invention. This structure provides strikingly high anti-soil redeposition ability against hydrophobic soils and also provides high compatibility with surfactants. Owing to high compatibility with surfactants, when used in a liquid detergent or the like, the polyalkylene glycol-based polymer of the present invention has good temporal stability (stability against phase separation) in the detergent composition or the like.

In the present invention, the term "polyalkylene glycol-based polymer" is intended to include polymers having a polyalkylene glycol chain, and the term "polyalkylene glycol-based monomer" is intended to include monomers having a polyalkylene glycol chain.

$R^1$ in the formula (1) represents H or a methyl group, and is preferably a methyl group among these.

X in the formula (1) represents a methylene group, an ethylene group, or a direct bond, and is preferably a methylene group or an ethylene group, and more preferably an ethylene group among these.

When used in a detergent composition, the polymer of the present invention in which X in the formula (1) is a methylene group, an ethylene group, or a direct bond have stable high washing performance, clay dispersibility, anti-soil redeposition ability, and the like under neutral to weak alkaline conditions, which are suitable for washing treatment.

For example, polyalkylene glycol-based monomers having an ester bond connecting an unsaturated double bond and a polyalkylene glycol chain are exemplified as polyalkylene glycol-based monomers in which X in the formula (1) is not any of a methylene group, an ethylene group, and a direct bond. These monomers or polymers obtained by polymerizing these monomers undergo hydrolysis of the ester bond during the synthesis or polymerization of the monomers, or while in use. Typically, polyalkylene glycol-based monomers have high molecular weights and therefore will significantly influence on the characteristics of polymers obtained by polymerizing these monomers even if only small portion of the ester bonds in the monomers are hydrolyzed. Namely, these polymers will have variations in the characteristics. In contrast, the polyalkylene glycol-based monomer (A) in which X in the formula (1) is a methylene group, an ethylene group, or a direct bond is highly stable against pH and temperature variations. Therefore, the monomer (A) and the polymer obtained by polymerizing the monomer (A) are hardly decomposed during the synthesis or polymerization of the monomer or while in use, for example, even under stringent conditions in detergent production. The polyalkylene glycol-based monomer (A) is more copolymerizable when X is an ethylene group than when the monomer (A) contains an unsaturated double bond such as an allyl ether bond or a vinyl ether bond. Owing to high copolymerizability, variations in the amount of residual monomers after polymerization are reduced, which leads to reduced variations in the performance of the resulting polymer.

For these reasons, when X in the formula (1) is an ethylene group, the polymer of the present invention has particularly high performance and is substantially free from the above problems when used in a detergent and the like. In addition, variations of the product quality can be reduced.

For example, the structure represented by $CH_2=CH-X-O-$ is the structure represented by $CH_2=CH-O-$ when X is a direct bond.

$R^2$ in the formula (1) represents a $C_{2-20}$ alkylene group, and each of $R^2$s may be the same as or different from each other. In order to improve the polymerizability of the polyalkylene glycol-based monomer (A), $R^2$ is preferably a $C_{2-4}$ alkylene group, more preferably $C_{2-3}$ alkylene group, and further more preferably a $C_2$ alkylene group. Specifically, $C_{2-4}$ alkylene groups such as ethylene group, propylene group, and butylene group are preferable, and $C_{2-3}$ alkylene groups such as ethylene group and propylene group are more preferable. Among these, the $C_2$ alkylene group, ethylene group, is particularly preferable.

$R^2$s may be all of the same structure or may be of two or more different structures. Preferably, ethylene groups constitute 80 to 100 mol % of all $R^2$s (100 mol %) in the formula (1), more preferably 90 to 100 mol %, and further more preferably 100 mol % of all $R^2$s (100 mol %) in the formula (1).

In the case that $R^2$s are of two or more different structures, the added oxyalkylene groups each represented by $-R^2-O-$ may be arranged in any fashion such as a random, block, or alternating fashion.

$R^3$ in the formula (1) represents a $C_{3-4}$ alkylene group, and each of $R^3$s may be the same as or different from each other. Among these, isopropylene groups and isobutylene groups, that is, $-CH_2CH(CH_3)-$, $-CH(CH_3)CH_2-$, $-CH_2CH(C_2H_5)-$, and $-CH(C_2H_5)CH_2-$ are particularly preferable. When $R^3$ is selected from the group consisting of these structures, the polyalkylene glycol-based monomer (A) can be produced with little impurities, and the anti-soil redeposition ability of the polymer of the present invention can be improved.

$R^3$s may be all of the same structure or may be of two or more different structures. Preferably, $C_3$ alkylene groups constitute 80 to 100 mol % of all $R^3$s (100 mol %) in the formula (1), more preferably 90 to 100 mol %, and further more preferably 100 mol % of all $R^3$s (100 mol %) in the formula (1).

In the case that $R^3$s are of two or more different structures, the added oxyalkylene groups each represented by $-R^3-O-$ may be arranged in any fashion such as a random, block, or alternating fashion.

$R^4$ in the formula (1) represents H, a $C_{1-24}$ alkyl group, or a $C_{6-24}$ aryl group. When $R^4$ is an alkyl group or aryl group, one or more hydrogen atoms in $R^4$ may or may not be substituted with other organic group(s), provided that the total number of carbon atoms is within the above-mentioned range. Examples of the other organic groups include alkyl groups (in this case, when $R^4$ is an alkyl group, the alkyl group with substituent(s) is regarded as an unsubstituted alkyl group as a whole), aryl groups, alkenyl groups, alkoxy groups, hydroxyl group, acyl groups, ether groups, amide groups, ester groups, and ketone groups.

Among the above examples, $R^4$ is preferably H, a $C_{1-12}$ alkyl group, or a $C_{6-12}$ aryl group, more preferably H, a $C_{1-8}$ alkyl group, or a $C_{6-8}$ aryl group, and further more preferably H, a $C_{1-4}$ alkyl group, or a $C_{6-8}$ aryl group. These structures at $R^4$ enable the polyalkylene glycol-based monomer (A) to be produced with high yield and thus improve the polymerizability of the monomer and the purity of the resulting polymer. In addition, the anti-soil redeposition ability of the resulting polymer is also improved. Specifically, suitable examples of $R^4$ include H; alkyl groups such as methyl group, ethyl group, isopropyl group, n-propyl group, n-butyl group, isobutyl group, octyl group, lauryl group, stearyl group, cyclohexyl group, and 2-ethylhexyl group; aryl groups such as phenyl group, benzyl group, phenethyl group, 2,3- and 2,4-xylyl groups, mesityl group, and naphthyl group; and groups obtained by substituting hydrogen atom(s) in the above groups with alkoxy groups, carboxyester groups, amino groups, amide groups, and hydroxyl groups (e.g. hydroxyethyl group, hydroxypropyl group). $R^4$ is more preferably H or a methyl group among these because they allow use of a simple process to produce the polyalkylene glycol-based monomer (A) and reduce impurities. $R^4$ is further more preferably H.

In the formula (1), n represents an average addition number of moles of the oxyalkylene group (—$R^2$—O—), and is from 1 to 300. In order to further strikingly improve performance of the polyalkylene glycol-based polymer of the present invention in aqueous environment, n is preferably an integer of 2 to 100, and more preferably an integer of 3 to 55.

In the formula (1), m represents an average addition number of moles of the oxyalkylene group (—$R^3$—O—) and is from 1 to 20. In order to further strikingly improve performance of the polyalkylene glycol-based polymer of the present invention in aqueous environment, m is preferably an integer of from 2 to 15, and more preferably an integer of from 3 to 10.

Out of 100 mol % of all the oxyalkylene groups represented by (—$R^2$—O—) and (—$R^3$—O—) in the formula (1) in the polyalkylene glycol-based monomer (A), $C_{3-4}$ oxyalkylene groups preferably constitute 1 to 90 mol %, more preferably 3 to 80 mol %, and further more preferably 5 to 50 mol %. With $C_{3-4}$ oxyalkylene groups within the above range, the performance of the polyalkylene glycol-based polymer of the present invention in aqueous environment is strikingly improved, and the washing performance against hydrophobic soils is also improved. In addition, with $C_{3-4}$ oxyalkylene groups within this range, the compatibility of the polyalkylene glycol-based polymer of the present invention with liquid detergents is also improved.

The polyalkylene glycol-based polymer of the present invention contains the structure unit (a) derived from the polyalkylene glycol-based monomer (A). The structure unit (a) is represented by the formula (2) in which the double bond between carbons in the polyalkylene glycol-based monomer (A) is converted to a single bond.

[Chem. 6]

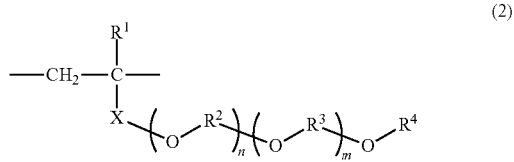

(2)

In the formula, $R^1$, X, $R^2$, $R^3$, $R^4$, n, and m are defined the same as $R^1$, X, $R^2$, $R^3$, $R^4$, n, and m in the formula (1).

The phrase "the polyalkylene glycol-based polymer of the present invention contains the structure unit (a) derived from the polyalkylene glycol-based monomer (A)" means that the final polymer product contains the structure unit represented by the formula (2). Specifically, the term "the unit (a) derived from the polyalkylene glycol-based monomer (A)" used herein is intended to include structure units introduced in a step before or after the polymerization reaction such as structure units added by introducing side chains of specific structures after the main chain structure of the polyalkylene glycol-based polymer is formed by copolymerization, in addition to structure units introduced in the polymer by synthesizing the polyalkylene glycol-based monomer (A) and then copolymerizing the polyalkylene glycol-based monomer (A) and other monomers.

The structure units (a) in the polyalkylene glycol-based polymer of the present invention may be all of the same structure or may be of two or more different structures.

The polyalkylene glycol-based polymer of the present invention contains the structure unit (a) at a level of from 1 to 90% by mass based on 100% by mass of all structure units derived from all monomers in the polyalkylene glycol-based polymer (i.e. the structure unit (a), and structure units (b) and (e) described below). With the structure unit (a) at a level within this range, the polymer of the present invention produces excellent interaction with soil components when used as a detergent builder. As a result, soil component particles involved in the interaction with the polymer are well dispersed, and thus the anti-soil redeposition ability is provided. In addition, the compatibility with surfactants is strikingly improved. The level of the structure unit (a) is preferably 5 to 80% by mass, more preferably 10 to 70% by mass, and further more preferably 15 to 65% by mass.

The process for preparing the polyalkylene glycol-based monomer (A) is not particularly limited, and any suitable preparation process may be employed. Example of simple preparation processes include: a process including sequentially adding a $C_2$ alkylene oxide and a $C_{3-4}$ alkylene oxide to hydroxyl groups of an unsaturated alcohol such as (meth)allyl alcohol, isoprenol, ethylene glycol monovinyl ether, or butylene glycol monovinyl ether; and a process including reacting an unsaturated halogen compound such as (meth)allyl chloride or isoprenyl chloride with a monoalkoxy alkylene glycol.

The addition reaction of an alkylene oxide to hydrogen groups may be carried out under common reaction conditions and the like.

<Carboxyl Group-Containing Monomer (B)>

The polyalkylene glycol-based polymer of the present invention contains the structure unit (b) derived from the carboxyl group-containing monomer (B).

The carboxyl group-containing monomer (B) is a monomer essentially containing 1) an unsaturated double bond and 2) a carboxyl group and/or a salt thereof. Specific examples thereof include unsaturated monocarboxylic acid-based monomers such as unsaturated monocarboxylic acids (e.g. acrylic acid, methacrylic acid, crotonic acid, α-hydroxyacrylic acid, α-hydroxymethylacrylic acid, derivatives of these), and salts of these; and unsaturated dicarboxylic acid-based monomers such as unsaturated dicarboxylic acids (e.g. itaconic acid, fumaric acid, maleic acid, citraconic acid, 2-methyleneglutaric acid), and salts of these.

Any unsaturated dicarboxylic acid-based monomer may be used, provided that it contains an unsaturated group and two carboxyl groups in the molecular structure, and suitable examples thereof include maleic acid, itaconic acid, citraconic acid, and fumaric acid; monovalent metal salts, divalent metal salts, ammonium salts, and organic ammonium salts (organic amine salts) of the above acids; and anhydrides of the above examples.

Among these examples, the carboxyl group-containing monomer (B) is preferably acrylic acid, an acrylate, maleic acid, or a maleate because they remarkably improve the anti-soil redeposition ability of the resulting polyalkylene glycol-based polymer. It is more preferable to essentially use acrylic acid or an acrylate.

Suitable examples of salts of the unsaturated monocarboxylic acids and unsaturated dicarboxylic acids include metal salts, ammonium salts, and organic amine salts of these acids.

Examples of the metal salts include monovalent alkali metal salts such as sodium salts, lithium salts, and potassium salts; alkaline-earth metal salts such as magnesium salts and calcium salts; and salts of other metals such as aluminum salts and iron salts.

Examples of the organic amine salts include alkanolamine salts such as monoethanolamine salts, diethanolamine salts, and triethanolamine salts; alkylamine salts such as monoethylamine salts, diethylamine salts, and triethylamine salts;

and organic amine salts such as polyamines including ethylenediamine salts and triethylenediamine salts.

Ammonium salts, sodium salts, and potassium salts are preferable among these because they remarkably improve the anti-soil redeposition ability of the resulting polymer. Sodium salts are more preferable.

In addition to the above examples, examples of the carboxyl group-containing monomer (B) include half esters of unsaturated dicarboxylic acids and $C_{1-22}$ alcohols, half amides of unsaturated dicarboxylic acids and $C_{1-22}$ amines, half esters of unsaturated dicarboxylic acids and $C_{2-4}$ glycols, and half amides of maleamic acid and $C_{2-4}$ glycols.

In the structure unit (b) derived from the carboxyl group-containing monomer (B), the unsaturated double bond in the monomer (B) is converted to a single bond. The phrase "the polyalkylene glycol-based polymer of the present invention contains the structure unit (b) derived from the carboxyl group-containing monomer (B)" means that the final polymer product contains a structure unit in which the unsaturated double bond in the monomer (B) is converted to a single bond.

The structure units (b) in the polyalkylene glycol-based polymer of the present invention may be all of the same structure or may be of two or more different structures.

The polyalkylene glycol-based polymer of the present invention contains the structure unit (b) at a level of from 10 to 99% by mass based on 100% by mass of all structure units derived from all monomers in the polyalkylene glycol-based polymer (i.e. the structure unit (a), and structure units (b) and (e) described below). With the structure unit (b) at a level within this range, the polyalkylene glycol-based polymer is highly soluble to water when used as a detergent builder. As a result, soil component particles involved in the interaction with the structure unit (a) in the polyalkylene glycol-based polymer are well dispersed, and thus the anti-soil redeposition ability is provided. In addition, the compatibility with surfactants is strikingly improved. The level of the structure unit (b) is preferably 20 to 95% by mass, more preferably 30 to 90% by mass, and further more preferably 35 to 85% by mass.

In the present invention, when the mass ratio (% by mass) of the structure unit (b) derived from the carboxyl group-containing monomer (B) to all the structure units derived from all the monomers in the polyalkylene glycol-based polymer is calculated, the structure unit (b) is treated as the corresponding acid. In the case of the structure unit —$CH_2$—CH(COONa)— derived from sodium acrylate, the mass ratio (% by mass) of the structure unit derived from the corresponding acid, acrylic acid, that is, the mass ratio (% by mass) of the structure unit —$CH_2$—CH(COOH)— is calculated. When the mass ratio (% by mass) of the carboxyl group-containing monomer (B) to all the monomers is calculated, the carboxyl group-containing monomer (B) is similarly treated as the corresponding acid. For example, to determine the mass ratio of sodium acrylate, the mass ratio (% by mass) of the corresponding acid, acrylic acid, is calculated instead.

<Other Monomer>

The polyalkylene glycol-based polymer of the present invention may contain structure unit(s) (e) derived from other monomer(s) (E) (monomers other than the polyalkylene glycol-based monomer (A) and carboxyl group-containing monomer (B)). The structure units (e) in the polyalkylene glycol-based polymer of the present invention may be all of the same structure or may be of two or more different structures.

The other monomer(s) (E) are not particularly limited, provided that they are copolymerizable with the monomers (A) and (B). The other monomer(s) (E) are appropriately selected to provide a desired effect. Specific examples thereof include sulfonic acid group-containing monomers such as vinylsulfonic acid, (meth)allylsulfonic acid, isoprenesulfonic acid, 3-allyloxy-2-hydroxypropanesulfonic acid, and acrylamido-2-methylpropanesulfonic acid, and salts of these; polyalkylene glycol chain-containing monomer such as (meth)acrylates of alkoxy alkylene glycols and monomers obtained by adding alkylene oxides to unsaturated alcohols other than the monomer (A) (e.g. (meth)allyl alcohol, isoprenol); amino group-containing monomers such as vinyl aromatic compound-based monomers having a heterocyclic aromatic hydrocarbon group (e.g. vinyl pyridine, vinyl imidazole), dialkylaminoalkyl(meth)acrylates (e.g. dimethylaminoethyl acrylate, dimethylaminoethyl methacrylate, dimethylaminopropyl acrylate), dialkylaminoalkyl (meth)acrylamides (e.g. dimethylaminoethyl acrylamide, dimethylaminoethyl methacrylamide, dimethylaminopropyl acrylamide) and allylamines including diallylamine and diallylalkylamines (e.g. diallyldimethylamine), and quaternized compounds of these; N-vinyl monomers such as N-vinylpyrrolidone, N-vinylformamide, N-vinylacetamide, N-vinyl-N-methylformamide, N-vinyl-N-methylacetamide, and N-vinyloxazolidone; amide-containing monomers such as (meth)acrylamide, N,N-dimethylacrylamide, and N-isopropylacrylamide; hydroxyl group-containing monomers such as (meth)allyl alcohol and isoprenol; alkyl (meth)acrylate-based monomers such as butyl (meth)acrylate, 2-ethylhexyl(meth)acrylate, and dodecyl(meth)acrylate; hydroxyalkyl (meth)acrylate-based monomers such as hydroxyethyl(meth)acrylate, 2-hydroxyethyl(meth)acrylate, hydroxybutyl(meth)acrylate, 2-hydroxybutyl(meth)acrylate, 4-hydroxybutyl(meth)acrylate, α-hydroxymethylethyl(meth)acrylate, hydroxypentyl (meth)acrylate, hydroxyneopentyl(meth)acrylate, and hydroxyhexyl(meth)acrylate; vinylaryl monomers such as styrene, indene, and vinylaniline; and other monomers such as isobutylene, and vinyl acetate.

The quaternized compounds can be obtained by the reaction between the amino group-containing monomers and common quaternizing agents. Examples of the quaternizing agents include alkyl halides and dialkyl sulfates. The exemplified salts include hydrochlorides and organic acid salts.

In the structure unit(s) (e) derived from the other monomer(s) (E), the unsaturated double bond in the other monomer(s) (E) is converted to a single bond. The phrase "the polyalkylene glycol-based polymer of the present invention contains the structure unit(s) (e) derived from the other monomer(s) (E)" means that the final polymer product contains structure unit(s) (e) in which the unsaturated double bond in the monomer(s) (E) is converted to a single bond.

In the case that the polyalkylene glycol-based polymer of the present invention contains the optional structure unit(s) (e) derived from the other monomer(s) (E), the structure unit(s) (e) are preferably present at a level of from 0 to 60% by mass based on 100% by mass of all the structure units derived from all the monomers (the total amount of the structure units (a), (b) and (e)) in the polyalkylene glycol-based polymer, and more preferably 0 to 50% by mass.

When a structure unit derived from an amino group-containing monomer is contained as the structure unit (e), the mass ratio of the structure unit to all the structure units derived from all the monomers, and the mass ratio of the amino group-containing monomer to all the monomers are determined by treating the structure unit and the monomer as the corresponding unneutralized amine. For example, in the case that the other monomer (E) is vinylamine hydrochloride, the mass ratio (% by mass) of its corresponding unneutralized amine, that is, the mass ratio of vinylamine is calculated instead.

The mass ratios (% by mass) of quaternized amino group-containing monomers and structure units derived from the quaternized amino group-containing monomers are calculated without counting the mass of counteranion.

When a structure unit derived from an acid group-containing monomer is contained as the structure unit (e), the mass ratio (% by mass) of the structure unit to all the structure units derived from all the monomers is calculated by treating the structure unit as the corresponding acid. The mass ratio (% by mass) of the acid group-containing monomer to all the monomers is also calculated by treating the monomer as the corresponding acid.

<Other Characteristic and Property of Polyalkylene Glycol-Based Polymer>

In the polyalkylene glycol-based polymer of the present invention, the structure units (a) and (b) are introduced at specific levels, and the structure unit(s) (e) are optionally introduced at a specific level, as described above. These structure units may be arranged in either a random or block fashion.

The weight average molecular weight of the polyalkylene glycol-based polymer of the present invention is not particularly limited and can be appropriately selected. Specifically, the weight average molecular weight of the polyalkylene glycol-based polymer is preferably 2,000 to 200,000, more preferably 3,000 to 100,000, furthermore preferably 4,000 to 60,000, and still further more preferably 4,000 to 20,000. With weight average molecular weights in this range, the anti-soil redeposition ability is likely to be improved.

The number average molecular weight of the polyalkylene glycol-based polymer of the present invention is preferably 1,000 to 100,000, more preferably 1,500 to 50,000, further more preferably 2,000 to 25,000, and still further more preferably 2,000 to 8,000. With number average molecular weights in this range, the anti-soil redeposition ability is likely to be improved.

The weight average molecular weight and number average molecular weight used herein are determined by GPC (gel permeation chromatography) and can be determined with the device under the measurement conditions described in Examples below.

The polyalkylene glycol-based polymer of the present invention has high anti-soil redeposition ability. The anti-soil redeposition ratio of the polyalkylene glycol-based polymer is preferably not less than 59.3%, and more preferably not less than 59.5%.

The anti-soil redeposition ratio can be measured by the procedure described in Examples below.

(Polyalkylene Glycol-Based Polymer Composition)

The polyalkylene glycol-based polymer of the present invention may be present with other components in a polyalkylene glycol-based polymer composition. Examples of components other than the polyalkylene glycol-based polymer include residues of polymerization initiators, residual monomers, by-products of polymerization, and water. Such a polyalkylene glycol-based polymer composition may contain one or more of these components. The polyalkylene glycol-based polymer of the present invention is preferably present at a level of 1 to 100% by mass based on 100% by mass of the whole polyalkylene glycol-based polymer composition. A preferred example of the polyalkylene glycol-based polymer composition is a polyalkylene glycol-based polymer composition containing 40 to 60% by mass of the polyalkylene glycol-based polymer of the present invention and 40 to 60% by mass of water.

(Process for Producing Polyalkylene Glycol-Based Polymer of the Present Invention)

The polyalkylene glycol-based polymer of the present invention can be produced by copolymerizing monomers including the polyalkylene glycol-based monomer (A) (monomer (A)) and the carboxyl group-containing monomer (B) (monomer (B)), and optionally including other monomer(s) (E) (monomer(s) (E)) at specific ratios.

In the process for producing the polyalkylene glycol-based polymer of the present invention, the monomer (A) is added at a level of from 1 to 90% by mass based on 100% by mass of all the monomers (monomers (A), (B), and (E)), and the monomer (B) is added at a level of from 10 to 99% by mass based on 100% by mass of all the monomers. If the monomer (A) is added at a level of less than 1% by mass, the polymer is less likely to adsorb on hydrophobic soils, therefore the anti-soil redeposition ability and washing performance against hydrophobic soils will be low. If the monomer (B) is added at a level of less than 10% by mass, the polymer is less likely to adsorb on hydrophilic soils, therefore the anti-soil redeposition ability and washing performance against hydrophilic soils will be low. The monomer (A) is preferably used at a level of from 5 to 80% by mass in the polymerization, and more preferably at a level of from 10 to 70% by mass, and further more preferably at a level of from 15 to 65% by mass. The monomer (B) is preferably used at a level of from 20 to 95% by mass in the polymerization, more preferably at a level of from 30 to 90% by mass, and further more preferably at a level of from 35 to 85% by mass.

The monomer(s) (E) may be added at a level of from 0 to 50% by mass based on 100% by mass of all the monomers (monomers (A), (B), and (E)), and more preferably at a level of from 0 to 10% by mass, further more preferably at a level of from 0 to 5% by mass, and still further more preferably at 0% by mass.

The polyalkylene glycol-based polymer of the present invention may be produced by any polymerization method, and a known polymerization method or a modified method thereof can be used unless otherwise specified. Examples of polymerization methods include radical polymerization. Specific examples thereof include water-in-oil emulsion polymerization, oil-in-water emulsion polymerization, suspension polymerization, dispersion polymerization, precipitation polymerization, solution polymerization, aqueous solution polymerization, and bulk polymerization. Among these polymerization methods, solution polymerization is preferable because it is a highly safe method and requires only low production cost (polymerization cost).

In the case of solution polymerization, the monomers are polymerized in a solvent. The solvent is not particularly limited and may be a solvent commonly used in solution polymerization. Suitable examples of the solvent include aqueous solvents such as water, alcohols, glycols, glycerin, and polyethyleneglycol. Among these, water is more preferable.

Any one of these solvents may be used alone, or two or more of these may be used in combination. In order to improve the solubility of the monomers to the solvent, an organic solvent may be optionally added in an amount within a range of not affecting the polymerization reaction.

The organic solvent is not particularly limited, and any suitable organic solvent can be used. Examples thereof include lower alcohols such as methanol and ethanol; amides such as dimethylformaldehyde; and ethers such as diethyl ether and dioxane.

Any of these organic solvents may be used alone, or two or more of these may be used in combination.

The amount of the solvent is preferably 40 to 300 parts by mass, more preferably 45 to 200 parts by mass, and further more preferably 50 to 150 parts by mass per 100 parts by mass of all the monomers (monomers (A), (B), and (E)). The polymer produced under the presence of the solvent at a level of less than 40 parts by mass per 100 parts by mass of all the monomers may have too high molecular weights. With the solvent at a level of more than 300 parts by mass per 100 parts by mass of all the monomers, the concentration of the resulting polymer in the reaction system may be low, and a step for removing the solvent may be required in some cases. A portion or the whole of the solvent is charged in a reaction vessel at an initial stage of the polymerization, and a portion of the solvent may be added (or added dropwise) to the reaction system during the polymerization reaction. Alternatively, the monomers and agents such as initiators may be dissolved in the solvent and this solution containing these components may be added (or added dropwise) to the reaction system.

The reaction by solution polymerization may be carried out in any manner, and may be carried out in a common way. The reaction is typically carried out, for example, by charging the solvent in the reaction system, and adding dropwise a solution containing the monomers and a solution containing a polymerization initiator (hereinafter, also referred to as initiator). In such a case, the concentration of each solution to be added dropwise is not particularly limited, and may be appropriately determined.

The solution containing the monomers and solution containing the initiator may be added dropwise to the solvent set in the reaction system in any manner. For example, polymerization may be carried out by appropriately adding (or adding dropwise) the monomers (A) and (B), and optionally the monomer(s) (E), initiators, and other additives to the reaction system during the polymerization. Optionally, the monomers (A) and (B), and optionally the monomer(s) (E), initiators, and other additives may be dissolved in different solvents before the addition. In this case, a portion or the whole of the total amount of the monomer (A) may be charged in the reaction system before the start of the polymerization.

In the polymerization reaction by solution polymerization, addition of the monomer (A) is preferably completed before addition of the monomer (B). More preferably, at the completion of addition of the monomer (A), 5 to 100% by mass of the total amount of the monomer (B) is not added (remains). The remaining amount of the monomer (B) is further more preferably 10 to 50% by mass and particularly preferably 15 to 35% by mass of the total amount. By adding and polymerizing the monomers in such a manner as described above, the copolymerizability between the polyalkylene glycol-based monomer (A) and the carboxyl group-containing monomer (B), each of which has different polymerizability, is improved. As a result, the resulting polymer has improved clay dispersability and anti-soil redeposition ability.

<Polymerization Initiator>

In the production process, commonly used polymerization initiators may be used. Specifically, suitable examples thereof include hydrogen peroxide; persulfates such as sodium persulfate, potassium persulfate, and ammonium persulfate; azo compounds such as 2,2'-azobis(2-amidinopropane) hydrochloride, 4,4'-azobis-4-cyanovaleric acid, azobis isobutyronitrile, and 2,2'-azobis(4-methoxy-2,4-dimethylvaleronitrile); and organic peroxides such as benzoyl peroxide, lauroyl peroxide, peracetic acid, di-t-butyl peroxide, and cumene hydroperoxide. Hydrogen peroxides, persulfates, 2,2'-azobis(2-amidinopropane) hydrochloride are preferable among these polymerization initiators, and persulfates, 2,2'-azobis(2-amidinopropane) hydrochloride are more preferable. Any of these polymerization initiators may be used alone, or a mixture of two or more of these may be used.

<Chain Transfer Agent>

In the production process, chain transfer agents may be optionally used, as molecular weight controlling agents for the polymer, in an amount within a range of not affecting the polymerization. Specific examples of chain transfer agents include thiol-based chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethanesulfonic acid, n-dodecyl mercaptan, octyl mercaptan, and butyl thioglycolate; halides such as carbon tetrachloride, methylene chloride, bromoform, and bromotrichloroethane; secondary alcohols such as isopropanol and glycerin; and lower oxides and salts thereof such as phosphorous acid, hypophosphorous acid, salts of hypophosphorous acid (e.g. sodium hypophosphite, potassium hypophosphite), and sulfurous acid, hydrogen sulfurous acid, dithioic acid, metabisulfurous acid, and salts of these (e.g. sodium hydrogen sulfite, potassium hydrogen sulfite, sodium dithionite, potassium dithionite, sodium metabisulfite, potassium metabisulfite). Any of these chain transfer agents may be used alone, or a mixture of two or more of these may be used.

The use of chain transfer agents advantageously prevents the molecular weight of the resulting polymer from increasing over a certain level and therefore results in more efficient production of a low-molecular weight polyalkylene glycol-based polymer.

In the production process, sulfurous acid and/or sulfites (hereinafter, also referred to as "sulfurous acid (sulfite(s))") are preferably used as chain transfer agents. In this case, sulfurous acid (sulfite(s)) are used in combination with polymerization initiators. Heavy metal ions may also be used in combination as reaction accelerators, which are described later.

The term "sulfurous acid (sulfite(s))" is intended to include sulfurous acid, hydrogen sulfurous acid, and salts of these. Among these, salts of sulfurous acid and hydrogen sulfurous acid are suitable. Suitable examples of salts of sulfurous acid and hydrogen sulfurous acid include metal salts, ammonium salts, and organic ammonium salts, in addition to the above examples.

Preferred examples of the metals include monovalent alkali metals such as lithium, sodium, and potassium; divalent alkaline-earth metals such as calcium and magnesium; and trivalent metals such as aluminum and iron.

Suitable examples of organic ammoniums (organic amines) include alkanolamines such as ethanolamine, diethanolamine, and triethanolamine, and triethylamine. Other examples of the sulfites include ammonium sulfites.

Accordingly, preferred examples of sulfites used in the present invention include sodium hydrogen sulfite, potassium hydrogen sulfite, ammonium hydrogen sulfite, sodium sulfite, potassium sulfite, and ammonium sulfite. Sodium hydrogen sulfite is particularly suitable. Any of these sulfurous acid (sulfites) may be used alone, or a mixture of two or more of these may be used.

<Reaction Accelerator>

In the production process, reaction accelerators may be added to reduce the amount of agents used in the reaction such as initiators. Examples of reaction accelerators include heavy metal ions. The term "heavy metal ions" used herein is intended to include metals having a specific gravity of not less than 4 $g/cm^3$. Preferred examples of metal ions includes ions of iron, cobalt, manganese, chromium, molybdenum, tungsten, copper, silver, gold, lead, platinum, iridium, osmium, palladium, rhodium, and ruthenium. Any of these heavy metals may be used alone, or two or more of these may be used in combination. Among these, iron is more preferable. The ionic valency of the heavy metal ions is not particularly limited. For example, when iron is used as a heavy metal, the initiator may include iron in the $Fe^{2+}$ form, or $Fe^{3+}$ form, or may contain iron in both forms.

The heavy metal ions may be used in any forms, provided that they are present in ion forms. For handleability, the heavy metals are preferably used in solution forms obtained by dissolving heavy metal compounds. The heavy metal compounds are any compounds, provided that they contain a desired heavy metal that is to be captured in initiators. The heavy metal compounds can be selected according to initiators used in combination. When iron is selected as the heavy metal ion, preferred examples of heavy metal compounds include Mohr's salt ($Fe(NH_4)_2(SO_4)_2 \cdot 6H_2O$), ferrous sulfate heptahydrate, ferrous chloride, and ferric chloride. When manganese ion is selected as the heavy metal ion, manganese chloride or the like is suitably used. All of these are water-soluble compounds and therefore are used in aqueous solution forms and easy to handle. Solvents used for solutions containing the heavy metal compounds dissolved therein are not limited to water, provided that they dissolve the heavy metal compounds and will never inhibit the polymerization reaction in the process for producing a polyalkylene glycol-based polymer of the present invention.

The heavy metal ions may be added in any manner and are preferably added all before the completion of addition of the monomers, and are more preferably charged all at once at the start of the reaction. The amount of heavy metal ions is preferably not more than 100 ppm per the total amount of the reaction liquid, more preferably not more than 70 ppm, further more preferably not more than 50 ppm, and still further more preferably 30 ppm. Undesirably, addition of more than 100 ppm of heavy metal ions will not produce further effects and may provide highly colored polymers which are not suitable for use as detergent additives and the like.

The level of heavy metal ions is preferably 0.1 to 10 ppm in the total mass of the polymerization reaction liquid at the completion of the polymerization reaction. With less than 0.1 ppm of heavy metal ions, a sufficient effect may not be provided. With more than 10 ppm of heavy metal ions, the color tone of the resulting polymer will be deteriorated. Furthermore, polymers produced with too much heavy metal ions may cause colored soils when used as detergent builders.

The term "at the completion of the polymerization reaction" means the time when the polymerization reaction in the polymerization reaction liquid substantially ends such that the desired polymer is provided. For example, when the polymer produced in the polymerization reaction liquid is neutralized with an acid component, the mass of the heavy metal ions is determined based on the total amount of the polymerization reaction liquid after the neutralization. In the case that two or more heavy metal ions are contained, the total amount of heavy metal ions are within the above range.

In the production process, other compounds such as catalysts for decomposing polymerization initiators and reducing compounds may be added in the reaction system upon the polymerization in addition to the above-mentioned compounds.

Examples of catalysts for decomposing polymerization initiators include halogenated metals such as lithium chloride and lithium bromide; metal oxides such as titanium oxide and silica dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, and esters and metal salts thereof; heterocyclic amines such as pyridine, indole, imidazole, and carbazole, and derivatives thereof. Any of these decomposition catalysts may be used alone, or two or more of these may be used in combination.

Examples of reducing compounds include organic metal compounds such as ferrocene; inorganic compounds capable of generating metal ions (e.g. iron, copper, nickel, cobalt, manganese ions) such as iron naphthenate, copper naphthenate, nickel naphthenate, cobalt naphthenate, and manganese naphthenate; inorganic compounds such as ether adducts of boron trifluoride, potassium permanganate, and perchloric acid; sulfur-containing compounds such as sulfur dioxide, sulfites, sulfates, bisulfites, thiosulfates, sulfoxylates, benzene sulfinic acid and substituted compounds thereof, and analogues of cyclic sulfinic acid such as p-toluene sulfinic acid; mercapto compounds such as octyl mercaptan, dodecyl mercaptan, mercapto ethanol, α-mercaptopropionic acid, thioglycolic acid, thiopropionic acid, sodium α-thiopropionate sulfopropylester, and sodium α-thiopropionate sulfoethylester; nitrogen-containing compounds such as hydrazine, β-hydroxyethylhydrazine, and hydroxylamine; aldehydes such as formaldehyde, acetaldehyde, propionaldehyde, n-butylaldehyde, isobutylaldehyde, and isovalerianaldehyde; and ascorbic acid. Any of these reducing compounds may be used alone, or two or more of these may be used in combination. Some of the reducing compounds including mercapto compounds can be used as chain transfer agents.

The combination of chain transfer agents, initiators, and reaction accelerators is not particularly limited, and each of them can be suitably selected from the above examples. Preferred examples of the combination of chain transfer agents, initiators, and reaction accelerators include sodium hydrogen sulfite/hydrogen peroxide, sodium hydrogen sulfite/sodium persulfate, sodium hydrogen sulfite/Fe (ion), sodium hydrogen sulfite/hydrogen peroxide/Fe (ion), sodium hydrogen sulfite/sodium persulfate/Fe (ion), sodium hydrogen sulfite/sodium persulfate/hydrogen peroxide, and sodium hydrogen sulfite/oxygen/Fe (ion). Among these, sodium persulfate/hydrogen peroxide, sodium persulfate/hydrogen peroxide/Fe (ion), sodium hydrogen sulfite/sodium persulfate, sodium hydrogen sulfite/sodium persulfate/Fe (ion) are more preferable, and sodium hydrogen sulfite/sodium persulfate/Fe (ion), and sodium persulfate/hydrogen peroxide/Fe (ion) are further more preferable.

<Amount of Polymerization Initiator and Other Agent>

The amount of polymerization initiators is not particularly limited, provided that it is enough to initiate copolymerization of the monomers. The amount of polymerization initiators is preferably not more than 15 g per mol of all the monomers (monomers (A), (B), and (E)), and more preferably 1 to 12 g.

When hydrogen peroxide is used as an initiator, the amount of hydrogen peroxide is preferably 1.0 to 10.0 g, and more preferably 2.0 to 8.0 g per mol of all the monomers. Addition of less than 1.0 g of hydrogen peroxide is likely to increase the weight average molecular weight of the resulting polymer. On the other hand, addition of more than 10.0 g will no longer produce an effect proportional to the added amount and cause disadvantages such as a large amount of remaining hydrogen peroxide.

When a persulfate is used as an initiator, the amount of the persulfate is preferably 1.0 to 5.0 g, and more preferably 2.0 to 4.0 g per mol of all the monomers. The use of the persulfate in an amount less than the above range is likely to increase the molecular weight of the resulting polymer. On the other hand, addition of more than the above range will no longer produce an effect proportional to the added amount and cause disadvantages such as low purity of the resulting polymer.

When hydrogen peroxide and a persulfate are used in combination as initiators, the ratio of hydrogen peroxide and the persulfate to be added is determined by the mass ratio of the persulfate to hydrogen peroxide. The mass ratio is preferably 0.1 to 5.0, and more preferably 0.2 to 2.0. The use of the persulfate at a mass ratio of less than 0.1 is likely to increase the weight average molecular weight of the resulting copolymer. On the other hand, addition of the persulfate at a mass ratio of more than 5.0 will no longer produce a molecular weight reducing effect proportional to the added amount, and therefore the persulfate will be wasted in the polymerization reaction system.

It is preferable to almost continuously add dropwise hydrogen peroxide in an amount not less than 85% by weight of the predetermined required amount. The amount is more preferably not less than 90% by weight, and further more preferably 100% by weight (i.e. hydrogen peroxide is preferably all added dropwise). In the case that hydrogen peroxide is continuously added dropwise, the drop rate may be changed.

It is preferable to start drop-wise addition of hydrogen peroxide after a certain time period from the start of drop-wise addition of the monomers (other than monomers charged at the start of the reaction) when the reaction is carried out under suitable reaction conditions described below (e.g. temperature, pressure, pH). Specifically, hydrogen peroxide is preferably added after not less than one minute from the start of drop-wise addition of the monomer (A), more preferably not less than three minutes from the start, further more preferably not less than five minutes after the start, and still further more preferably not less than ten minutes after the start of drop-wise addition of the monomer (A). The time period before the start of drop-wise addition of hydrogen peroxide allows smooth initiation of the polymerization at the initial stage, which in turn leads to a narrow molecular weight distribution.

The time period before the start of drop-wise addition of hydrogen peroxide is preferably not more than 60 minutes, more preferably not more than 30 minutes from the start of drop-wise addition of the monomers.

However, drop-wise addition of hydrogen peroxide may be simultaneously started with drop-wise addition of the monomers, or a portion of hydrogen peroxide may be charged in the reaction system before the start of drop-wise addition of the monomers. When a portion of hydrogen peroxide is charged in the reaction system in advance, the portion is preferably not more than 10% of the predetermined required amount, more preferably not more than 7%, further more preferably not more than 5%, and still further more preferably not more than 3%.

If hydrogen peroxide in an amount of more than 10% of the predetermined desired amount is added together with, for example, a persulfate to the reaction system before the start of drop-wise addition of the monomers, the concentration ratio of hydrogen peroxide to the persulfate is large, and therefore the polymerization will stop. If hydrogen peroxide is added after more than 60 minutes from the start of drop-wise addition of the monomers, reactions such as a chain transfer reaction by hydrogen peroxide will not initiate. As a result, polymers produced at an initial stage of the polymerization will have large molecular weights.

Preferably, drop-wise addition of hydrogen peroxide is completed simultaneously with the completion of drop-wise addition of the monomers when the reaction is carried out under the suitable reaction conditions described below (e.g. temperature, pressure, pH). Addition of hydrogen peroxide is more preferably completed not less than 10 minutes, and further more preferably not less than 30 minutes before the completion of drop-wise addition of the monomers. Even if drop-wise addition of hydrogen peroxide is completed after the completion of drop-wise addition of the monomers, the polymerization system does not suffer from any disadvantages. However, portion of added hydrogen peroxide remains undecomposed at the completion of the polymerization. Unreacted hydrogen peroxide does not produce the effect and is used in vain. If a large amount of hydrogen peroxide remains, remaining hydrogen peroxide disadvantageously affects the thermal stability of the resulting polymer.

The persulfate may be added in any manner. Considering the characteristics such as decomposability, it is preferable to almost continuously add dropwise the persulfate in an amount of not less than 50% by mass of the predetermined required amount. The amount is more preferably not less than 80% by mass, and further more preferably 100% by mass (i.e. the persulfate is preferably all added dropwise). In the case that the persulfate is continuously added dropwise, the drop rate may be changed.

The drop-wise addition time is also not particularly limited. Since the persulfate is an initiator to be decomposed in a comparatively short time when the reaction is carried out under the suitable reaction conditions described below (e.g. temperature, pressure, pH), it is preferable to continue drop-wise addition of the persulfate until the completion of drop-wise addition of the monomers. It is more preferable to complete drop-wise addition of the persulfate within 30 minutes after the completion of drop-wise addition of the monomers, and is more preferable to complete the addition within 5 to 20 minutes after drop-wise addition of the monomers. Through such operation, the amount of residual monomers in the resulting polymer composition can be strikingly reduced.

Even if drop-wise addition of the initiators is completed before the completion of drop-wise addition of the monomers, the polymerization does not suffer from any disadvantages. The timing of the completion of drop-wise addition of the initiators can be determined according to the amount of residual monomers in the resulting polymer composition.

For initiators which are decomposed in a comparatively short time, such as persulfates, the completion timing of drop-wise addition is described above, and the starting timing thereof is not particularly limited and is appropriately determined. For example, drop-wise addition of such an initiator may be started before drop-wise addition of the monomers. When two or more of such initiators are used in combination, a certain time after the start of drop-wise addition of one of the initiators or after the completion of drop-wise addition of the initiator, drop-wise addition of the other initiator(s) may be started. In each case, the starting timing of drop-wise addition of initiators can be suitably determined according to the decomposition speed of the initiators and the reactivity of the monomers.

In the case that a polymerization initiator is added drop-wise, the concentration of the initiator solution is not particularly limited and is preferably 5 to 60% by weight, and more preferably 10 to 50% by weight. Initiator concentrations of less than 5% by weight mean strikingly low concentrations of the monomers in the polymerization reaction system. In these cases, the polymerizability of the monomers will be strikingly low, and a remarkably large portion of the monomers will remain in the resulting polymer composition. Such solutions are disadvantageous in terms of cost because of their low transportation efficiency and productivity. Concentrations of more than 60% by weight are disadvantageous in terms of safety and handleablilty upon drop-wise addition.

The amount of chain transfer agents is not particularly limited, provided that it is determined so that the monomers (A), (B), and (E) are allowed to polymerize well. The amount of chain transfer agents is preferably 1 to 20 g, and more preferably 2 to 15 g per mol of all the monomers (monomers (A), (B), and (E)). With less than 1 g of chain transfer agents, the molecular weight of the resulting polymer cannot be controlled. The use of more than 20 g of chain transfer agents may result in formation of large amounts of impurities and therefore lead to low purity of the resulting polymer. Especially, when a sulfite is used, excess sulfite is decomposed in the reaction system, which may disadvantageously result in generation of sulfur dioxide. In addition, the use of more than 20 g of chain transfer agents is disadvantageous in terms of cost.

The more preferred combination of initiators and chain transfer agents is one or more of persulfates and one or more of sulfites. In this case, the blending ratio between the persulfate(s) and the sulfite(s) is not particularly limited. Preferably, 0.5 to 5 parts by mass of the sulfite(s) are used with respect to 1 part by mass of the persulfate(s). The lower limit of the amount of the sulfite(s) is more preferably 1 part by mass, and is further more preferably 2 parts by mass with respect to 1 part by mass of the persulfate(s). The upper limit of the amount of the sulfite(s) is more preferably 4 parts by mass, and further more preferably 3 parts by mass with respect to 1 part by mass of the persulfate(s). If less than 0.5 parts by mass of the sulfate(s) are used with respect to 1 part by mass of the persulfate(s), the total initiator amount required to produce a lower-molecular weight polymer will increase. On the other hand, the use of more than 5 parts by weight of the sulfite(s) will increase side reactions and therefore increase impurities produced in the side reactions.

The total amount of chain transfer agents, initiators, and reaction accelerators is preferably 2 to 20 g per mol of all the monomers (A), (B), and (E). The use of them within this range enables the polymer of the present invention to be efficiently produced and controls the molecular weight distribution of the polyalkylene glycol-based polymer within a desired range. The total amount of them is more preferably 4 to 18 g, and further more preferably 6 to 15 g.

In the production process, the monomers, initiators, and chain transfer agents may be added in a reaction vessel by continuous addition such as drop-wise addition and portion-wise addition. Each of them may be separately charged in the reaction vessel, or may be mixed with other materials or in a solvent or the like in advance. Specifically, these materials may be added by methods such as a method including charging all the monomers into the reaction vessel and adding polymerization initiators to copolymerize the monomers; a method including charging a portion of the monomers into the reaction vessel, and adding polymerization initiators and the residual monomers continuously or portionwise (preferably, continuously) to the reaction vessel to copolymerize the monomers; and a method including charging a polymerization solvent into the reaction vessel, and adding all the monomers and polymerization initiators. Among these methods, the method including successively adding dropwise polymerization initiators and the monomers into the reaction vessel and copolymerizing the monomers is preferable because it provides polymers having a narrow (sharp) molecular weight distribution and improves the dispersability of soils and anti-soil redeposition ability. Polymerization may be batchwise polymerization or continuous polymerization.

<Polymerization Condition>

In the production process, the polymerization conditions such as polymerization temperature are appropriately determined based on factors such as the polymerization method, solvents, and polymerization initiators. The polymerization temperature is preferably not lower than 25° C. to 200° C., and more preferably 50° C. to 150° C., further more preferably 60° C. to 120° C., and still further more preferably 80° C. to 110° C. At too low polymerization temperatures, the resulting polymer will have too high weight average molecular weight and larger amounts of impurities will generate.

The polymerization temperature is not necessarily kept substantially constant throughout the polymerization reaction, and the temperature may be set at room temperature at the start of the polymerization, increased to a set temperature at an appropriate temperature rising rate or over an appropriate temperature rising time, and then kept at the set temperature. Alternatively, the temperature may be altered (increased or decreased) with a lapse of time during the polymerization reaction depending on the drop-wise addition method for the monomers, initiators, and the like. The term "polymerization temperature" used herein means the temperature of the reaction solution of the polymerization reaction. The method for measuring the polymerization temperature and means for controlling the polymerization temperature may be suitably selected from any methods and controlling means. For example, the polymerization temperature can be measured with a common device.

The pressure during the polymerization is not particularly limited and can be suitably determined. For example, the pressure may be any of normal pressure (atmospheric pressure), reduced pressure, and increased pressure. The atmosphere in the reaction system may be an air or inert gas atmosphere. In order to produce an inert gas atmosphere in the reaction system, the air in the system is replaced with an inert gas such as nitrogen before the start of the polymerization. In this atmosphere, the atmospheric gas (such as oxygen gas) dissolves in the liquid phase and serves as a polymerization inhibitor.

In the production process, the solids content of the reaction solution (polymer solution) at the end of the polymerization reaction following the completion of addition of the above materials is preferably not less than 35% by mass. With solids contents of less than 35% by mass, the productivity of the resulting polymer is not strikingly improved. The solids content is more preferably 40 to 70% by mass, and further more preferably 45 to 65% by mass. Solids contents of not less than 35% by mass at the end of the polymerization reaction mean that polymerization has been performed in one step at high concentrations. Namely, the polymer can be effectively produced. In this case, steps such as concentration step can be omitted, which in turn leads to remarkable improvement in the productivity of the polymer and suppresses an increase in the production cost. The term "the end of the polymerization reaction" means the timing at which addition of all the materials are completed. The solids content is preferably maintained within the above range even after a subsequent predetermined maturing time (i.e. at the completion of the polymerization). The solids content can be calculated by quantifying nonvolatile matters after one-hour treatment with a hot air dryer at 130° C.

The maturing time is preferably 1 to 120 minutes, more preferably 5 to 60 minutes, and further more preferably 10 to 30 minutes. Maturing times of less than one minute are insufficient such that portion of the monomers may remain. As a result, impurities derived from the remaining monomers may deteriorate performance of the product. Maturing times of more than 120 minutes may result in colored polymer solutions.

In the production process, the polymerization time is not particularly limited, and is preferably 30 to 420 minutes, more preferably 45 to 390 minutes, further more preferably 60 to 360 minutes, and still further more preferably 90 to 300 minutes. The term "polymerization time" used herein means a time in which the monomers are being added, that is, a time from the start to the end of addition of the monomers.

The polyalkylene glycol-based polymer produced by the above production process has high performance when used in aqueous environment. In addition, the polymer has high hard water resistance, washing performance, anti-soil redeposition ability, clay dispersability, and interaction with surfactants and therefore has particularly high performance when used in dispersants, detergent builders, detergent compositions, detergents, and water treatment agents.

[Usage of Polyalkylene Glycol-Based Polymer of the Present Invention and Polyalkylene Glycol-Based Polymer Composition]

The polyalkylene glycol-based polymer of the present invention (or polyalkylene glycol-based polymer composition) can be used as a coagulant, flocculating agent, printing ink, adhesive, soil control (modification) agent, fire retardant, skin care agent, hair care agent, additive for shampoos, hair sprays, soaps, and cosmetics, anion exchange resin, dye mordant, and auxiliary agent for fibers and photographic films, pigment spreader for paper making, paper reinforcing agent, emulsifier, preservative, softening agent for textiles and paper, additive for lubricants, water treatment agent, fiber treating agent, dispersant, additive for detergents, scale control agent (scale depressant), metal ion sealing agent, viscosity improver, binder of any type, emulsifier, and the like. When used as a detergent builder, the polyalkylene glycol-based polymer of the present invention (or polyalkylene glycol-based polymer composition) can be added to detergents for various usages such as detergents for clothes, tableware, cleaning, hair, bodies, toothbrushing, and vehicles.

<Water Treatment Agent>

The polyalkylene glycol-based polymer of the present invention (or polyalkylene glycol-based polymer composition) can be used in water treatment agents. When used in water treatment agents, the polyalkylene glycol-based polymer of the present invention (or polyalkylene glycol-based polymer composition) may be provided as a composition formulated with polyphosphates, phosphates, anti-corrosion agents, slime control agents, and chelating agents, if necessary.

Such water treatment agents are useful for scale inhibition of cooling water circulation systems, boiler water circulation systems, seawater desalination plants, pulp digesters, black liquor condensing kettles and the like. In addition, any suitable water soluble polymer may be included within a range of not affecting the performance or effect of this polymer.

<Fiber Treating Agent>

The polyalkylene glycol-based polymer of the present invention (or polyalkylene glycol-based polymer composition) can be used in fiber treating agents. Such fiber treating agents contain the polyalkylene glycol-based polymer of the present invention (or polyalkylene glycol-based polymer composition) and at least one selected from the group consisting of dyeing agents, peroxides, and surfactants.

In fiber treating agents, the polyalkylene glycol-based polymer of the present invention preferably constitutes 1 to 100% by weight, and more preferably 5 to 100% by weight of the total amount. In addition, any suitable water soluble polymer may be included within a range of not affecting the performance or effect of this polymer.

An example of the composition of such a fiber treating agent is described below. The fiber treating agent can be used in steps of scouring, dyeing, bleaching and soaping in fiber treatment. Examples of dyeing agents, peroxides, and surfactants include those commonly used in fiber treating agents.

The blending ratio between the polyalkylene glycol-based polymer of the present invention and at least one selected from the group consisting of dyeing agents, peroxides, and surfactants is determined based on the amount of the purity converted fiber treating agent per part by weight of the polymer of the present invention. In a suitable example of a composition that is used as a fiber treating agent to provide improved degree of whiteness, color uniformity, and dyeing fastness of textiles, at least one selected from the group consisting of dyeing agents, peroxides, and surfactants is preferably used at a ratio of 0.1 to 100 parts by weight per part by weight of the polyalkylene glycol-based polymer of the present invention.

The fiber treating agent can be used for any suitable fibers including cellulosic fibers such as cotton and hemp, synthetic fibers such as nylon and polyester, animal fibers such as wool and silk thread, semisynthetic fibers such as rayon, and textiles and mixed products of these.

For a fiber treating agent used in a scouring step, an alkali agent and a surfactant are preferably used with the polyalkylene glycol-based polymer of the present invention. For a fiber treating agent used in a bleaching step, a peroxide and a silicic acid-containing agent such as sodium silicate as a decomposition inhibitor for alkaline bleaches are preferably used with the polyalkylene glycol-based polymer of the present invention.

<Inorganic Pigment Dispersant>

The polyalkylene glycol-based polymer of the present invention (or polyalkylene glycol-based polymer composition) can be used in inorganic pigment dispersants. When used in inorganic pigment dispersants, the polyalkylene glycol-based polymer of the present invention (or polyalkylene glycol-based polymer composition) may be provided as a composition formulated with condensed phosphoric acid and salts thereof, phosphoric acid and salts thereof, and polyvinyl alcohol, if necessary.

In inorganic pigment dispersants, the polyalkylene glycol-based polymer of the present invention preferably constitutes 5 to 100% by weight of the total amount. In addition, any suitable water soluble polymer may be included within a range of not affecting the performance or effect of this polymer.

Such inorganic pigment dispersants produce good performance as inorganic pigment dispersants for heavy or light calcium carbonate and clay used for paper coating. For example, by adding such an inorganic pigment dispersing agent in a small amount to inorganic pigments and dispersing them into water, a highly concentrated inorganic pigment slurry such as a high concentrated calcium carbonate slurry having low viscosity, high fluidity, and excellent temporal stability of these properties can be produced.

When such an inorganic pigment dispersant is used as a dispersant for inorganic pigments, the amount of the inorganic pigment dispersant is preferably 0.05 to 2.0 parts by weight per 100 parts by weight of pigments. The use of the inorganic pigment dispersant in an amount within the above range provides a sufficient dispersion effect proportional to the added amount and is advantageous in terms of cost.

<Detergent Builder>

The polyalkylene glycol-based polymer of the present invention (or polyalkylene glycol-based polymer composition) can be also used as a detergent builder. The detergent builder can be added to detergents for various usages such as detergents for clothes, tableware, cleaning, hair, bodies, toothbrushing, and vehicles.

<Detergent Composition>

The polyalkylene glycol-based polymer of the present invention (or polyalkylene glycol-based polymer composition) can be also used in detergent compositions.

In detergent compositions, the amount of the polyalkylene glycol-based polymer is not particularly limited, and the polyalkylene glycol-based polymer is preferably used at a level of 0.1 to 15% by mass, more preferably 0.3 to 10% by mass, and further more preferably 0.5 to 5% by mass based on 100% by mass of the total amount. At levels within this range, the polyalkylene glycol-based polymer provides excellent detergent builder performance.

Detergent compositions used for washing typically contain surfactants and additives which are commonly used in detergents. Such surfactants and additives are not particularly limited and are appropriately selected based on common knowledge in the field of detergents. The detergent compositions may be in the form of a powder or liquid.

One or more surfactants selected from the group consisting of anionic surfactants, nonionic surfactants, cationic surfactants, and amphoteric surfactants are used.

When two or more of them are used in combination, the total amount of anionic surfactant(s) and nonionic surfactant(s) is preferably not less than 50% by mass, more preferably not less than 60% by mass, further more preferably not less than 70% by mass, and still further more preferably not less than 80% by mass based on 100% by mass of all the surfactants.

Suitable examples of anionic surfactants include alkylbenzene sulfonates, alkylether sulfates, alkenylether sulfates, alkyl sulfates, alkenyl sulfates, α-olefinsulfonates, α-sulfo fatty acids and α-sulfo fatty acid ester salts, alkane sulfonates, saturated fatty acid salts, unsaturated fatty acid salts, alkylether carboxylates, alkenylether carboxylates, amino acid-type surfactants, N-acylamino acid-type surfactants, alkyl phosphates and salts of these, and alkenyl phosphates and salts of these. The alkyl groups or alkenyl groups in these anionic surfactants may have alkyl side groups such as methyl side group.

Suitable examples of nonionic surfactants include polyoxyalkylene alkyl ethers, polyoxyalkylene alkenyl ethers, polyoxyethylene alkyl phenyl ethers, higher-fatty-acid alkanol amides and alkylene oxide adducts thereof, sucrose fatty acid esters, alkyl glycoxydes, fatty acid glycerin monoesters, and alkylamine oxides. The alkyl groups or the alkenyl groups in these nonionic surfactants may have alkyl side groups such as methyl side group.

Suitable examples of cationic surfactants include quarternary ammonium salts. Preferred examples of amphoteric surfactants include carboxyl-type amphoteric surfactants, and sulfobetaine-type amphoteric surfactants. The alkyl groups or the alkenyl groups in these cationic surfactants and amphoteric surfactants may have alkyl side groups such as methyl side group.

In detergent compositions, these surfactants are typically present at a level of 10 to 60% by mass based on 100% by mass of the total amount, and are preferably present at a level of 15 to 50% by mass, more preferably at a level of 20 to 45% by mass, and further more preferably at a level of 25 to 40% by mass. The use of surfactants at a too small level may result in insufficient washing performance, and the use of surfactants at a too high level is disadvantageous in terms of cost.

Suitable examples of additives include alkali builders, chelate builders, anti-redeposition agents for preventing redeposition of contaminants such as sodium carboxymethylcellulose, stain inhibitors such as benzotriazole and ethylenethiourea, soil release agents, color migration inhibitors, softening agents, alkaline substances for pH adjustment, perfumes, solubilizing agents, fluorescent agents, coloring agents, foaming agents, foam stabilizers, lustering agents, bactericides, bleaching agents, bleaching assistants, enzymes, dyes, and solvents. Powder detergent compositions preferably contain zeolite.

These detergent compositions may contain other detergent builders in addition to the polyalkylene glycol-based polymer of the present invention (or polyalkylene glycol-based polymer composition). Examples of other detergent builders are not particularly limited and include alkali builders such as carbonates, hydrogencarbonates, and silicates; chelate builders such as tripolyphosphates, pyrophosphates, Glauber's salt, nitrilotriacetates, ethylene diamine tetraacetates, citrates, salts of (meth)acrylic acid copolymers, acrylic acid-maleic acid copolymers, fumarates, and zeolite; and carboxyl derivatives of polysaccharides such as carboxymethyl cellulose. Examples of counter salts used with these builders include alkaline metals such as sodium and potassium, ammonium, and amines.

In the detergent compositions, the above additives and other detergent builders are preferably present at a level of 0.1 to 50% by mass based on 100% by mass of the total amount. The level is more preferably 0.2 to 40% by mass, further more preferably 0.3 to 35% by mass, still further more preferably 0.4 to 30% by mass, and particularly preferably 0.5 to 20% by mass. The use of the additives and other builders at a level of less than 0.1% by mass may result in insufficient washing performance, and the use of the additives and other builders at a level of more than 50% by mass is disadvantageous in terms of cost.

It is to be understood that the concept of the "detergent compositions" includes detergents used only for specific usages such as bleaching detergent in which the performance delivered by one component is improved, in addition to synthetic detergents of household detergents, detergents for industrial use such as detergents used in the textile industry and hard surface detergents.

When the detergent compositions are in the form of a liquid, the water content of the liquid detergent compositions is preferably 0.1 to 75% by mass, more preferably 0.2 to 70% by mass, further more preferably 0.5 to 65% by mass, still further more preferably 0.7 to 60% by mass, particularly preferably 1 to 55% by mass, and more particularly preferably 1.5 to 50% by mass.

When the detergent compositions are in the form of a liquid, the kaolin turbidity of the detergent compositions is preferably not more than 200 mg/L, more preferably not more than 150 mg/L, further more preferably not more than 120 mg/L, still further more preferably not more than 100 mg/L, and particularly preferably not more than 50 mg/L.

<Method for Measuring Kaolin Turbidity>

A uniformly stirred sample (liquid detergent) is charged in 50 mm square cells with a thickness of 10 mm, and bubbles are removed therefrom. Then, the sample is measured for turbidity (kaolin turbidity: mg/L) at 25° C. with a turbidimeter (trade name: NDH2000, product of Nihon Denshoku Industries Co., Ltd.).

Suitable examples of enzymes that can be mixed in the detergent compositions include proteases, lipases, and cellulases. Among these, proteases, alkali lipases, and alkali cellulases are preferable because of their high activity in alkali-washing liquids.

In the detergent compositions, the enzymes are preferably used at a level of not more than 5% by mass based on 100% by mass of the total amount. The use of more than 5% by mass of the enzymes will not improve the washing performance and may be disadvantageous in cost.

Suitable examples of alkali builders include silicates, carbonates, and sulfates. Suitable examples of the chelate builders include diglycollic acid, oxycarboxylates, EDTA (ethylenediaminetetraacetic acid), DTPA (diethylenetriamine pentaacetic acid), STPP (sodiumtripolyphosphate), and citratic acid. Water-soluble polycarboxylic acid-based polymers other than the polymer of the present invention may be used.

The detergent compositions have high dispersability and are less likely to show performance deterioration even when stored for a long time, or to generate precipitation of impurities even when stored at low temperature. Therefore, the use of the detergent compositions provides detergents with strikingly high performance and stability.

Effects of the Invention

The polyalkylene glycol-based polymer of the present invention is designed as described above and has high anti-soil redeposition ability and compatibility with surfactants in washing treatment. Owing to these properties, the polyalkylene glycol-based polymer of the present invention can be used in highly concentrated liquid detergents, and can be suitably used as a raw material for detergent additives and the like.

BEST MODE FOR CARRYING OUT THE INVENTION

Hereinafter, the present invention is described in more detail based on examples, but is not limited only to these examples. All parts are by weight unless otherwise specified, and all percentages are by mass unless otherwise specified.

The monomers and reaction intermediates were quantified and measured for various characteristic values by the methods described below.

<Measurement Condition of Weight Average Molecular Weight and Number Average Molecular Weight (GPC)>
Measuring device: L-7000 series (product of Hitachi Ltd.)
Detector: HITACHI RI Detector, L-7490
Column: SHODEX Asahipak GF-310-HQ, GF-710-HQ, GF-1G 7B (products of Showa Denko K. K.)
Column temperature: 40° C.
Flow velocity: 0.5 ml/min
Calibration curve: POLYETHYLENE GLYCOL STANDARD (product of GL Sciences, Inc.)
Eluant: 0.1 N sodium acetate/acetonitrile=3/1 (mass ratio)
<Qualitative Analysis of Carboxyl Group-Containing Monomer and Other Compound>
The carboxyl group-containing monomer and other compounds were quantified by liquid chromatography under the following conditions.
Measuring device: L-7000 series (product of Hitachi Ltd.)
Detector: UV detector, L-7400 (product of Hitachi Ltd.)
Column: SHODEX RSpak DE-413 (product of Showa Denko K. K.)
Temperature: 40.0° C.
Eluant: 0.1% phosphoric acid aqueous solution
Flow velocity: 1.0 ml/min <Qualitative Analysis of Polyalkylene Glycol-Based Monomer>
The polyalkylene glycol-based monomer was quantified by high-speed chromatography under the following conditions.
Measuring device: 8020 series (product of Tosoh Corp.)
Column: CAPCELL PAK C1 UG120 (product of Shiseido Co., Ltd.)
Temperature: 40.0° C.
Eluant: dodecahydrate solution of 10 mmol/L disodium hydrogen phosphate (pH 7 (controlled with phosphoric acid))/acetonitrile=45/55 (volume ratio)
Flow velocity: 1.0 ml/min
Detector: RI, UV (detection wavelength: 215 nm)
<Measurement of Solids Content>
A mixture of 1.0 g of a polyalkylene glycol-based polymer composition containing the polyalkylene glycol-based polymer of the present invention and 1.0 g of water was left in an oven heated to 130° C. in nitrogen atmosphere for one hour so as to be dried. The solids content (%) and volatile component content (%) were calculated from the mass change before and after the drying step.
<Production of Polyalkylene Glycol-Based Polymer>

Example 1

In a 500-mL glass separable flask equipped with a reflux condenser and a stirrer, pure water (58.6 g) and Mohr's salt (0.0017 g) were stirred while heating to 70° C. To the mixture, 80% acrylic acid aqueous solution (hereinafter, referred to as 80% AA) (65.0 g), 80% aqueous solution of propylene oxide 5 mol adduct of isoprenol-20 mol ethylene oxide adduct (hereinafter, referred to as 80% IPN20EO5PO) (43.3 g), 15% sodium persulfate (hereinafter, referred to as 15% NaPS) (25.0 g), and 15% sodium hydrogen sulfite (hereinafter, referred to as 15% SBS) (10.7 g) were separately added dropwise through different openings. The drop-wise addition times of 80% AA, 80% IPN20EO5PO, 15% NaPS, and 15% SBS were 180 minutes, 150 minutes, 190 minutes, and 180 minutes, respectively. The drop-wise addition of each solution was started at the same time. The temperature was controlled to 70° C. until the completion of drop-wise addition of 15% NaPS. The resulting solution was matured at the same controlled temperature for more 30 minutes after the completion of drop-wise addition of 15% NaPS and the polymerization was completed. After the completion of the polymerization, the reaction solution was left standing to be cooled and then was neutralized with 48% sodium hydroxide (hereinafter, referred to as 48% NaOH) (42.1 g). Through these steps, a copolymer composition (1) containing a copolymer (1) was prepared. The solids content of the copolymer composition (1) was 45%.

Example 2

In a 500-mL glass separable flask equipped with a reflux condenser and a stirrer, pure water (72.0 g) and Mohr's salt (0.0025 g) were stirred while heating to 70° C. To the mixture, 80% AA (65.0 g), 80% IPN20EO5PO (97.5 g), 15% NaPS (26.1 g), and 15% SBS (52.3 g) were separately added drop-wise through different openings. The drop-wise addition times of 80% AA, 80% IPN20EO5PO, 15% NaPS, and 15% SBS were 180 minutes, 150 minutes, 190 minutes, and 180 minutes, respectively. The drop-wise addition of each solution was started at the same time. The temperature was controlled to 70° C. until the completion of drop-wise addition of 15% NaPS. The resulting solution was matured at the same controlled temperature for more 30 minutes after the completion of drop-wise addition of 15% NaPS and the polymerization was completed. After the completion of the polymerization, the reaction solution was left standing to be cooled and then was neutralized with 48% NaOH (42.1 g). Through these steps, a copolymer composition (2) containing a copolymer (2) was prepared. The solids content of the copolymer composition (2) was 45%.

Example 3

In a 500-mL glass separable flask equipped with a reflux condenser and a stirrer, 60% aqueous solution of propylene oxide 5 mol adduct of isoprenol-10 mol ethylene oxide adduct (hereinafter, referred to as 60% IPN10EO5PO) (28.0 g) and Mohr's salt (0.0060 g) were stirred while heating to 90° C. To the mixture, 80% AA (45.0 g), 60% IPN10EO5PO (112.0 g), 15% NaPS (41.1 g), 35% sodium hydrogen sulfite (hereinafter, referred to as 35% SBS) (3.5 g), and pure water (2.0 g) were separately added dropwise through different openings. The drop-wise addition times of 80% AA, 60% IPN10EO5PO, 15% NaPS, 35% SBS, and pure water were 180 minutes, 120 minutes, 210 minutes, 175 minutes, and 175 minutes, respectively. The drop-wise addition of each solution was started at the same time. The temperature was controlled to 85° C. until the completion of drop-wise addition of 80% AA. The resulting solution was matured at the same controlled temperature for more 30 minutes after the completion of drop-wise addition of 15% NaPS and the polymerization was completed. After the completion of the polymerization, the reaction solution was left standing to be cooled and then was neutralized with 48% NaOH (37.5 g) and pure water (5.2 g). Through these steps, a copolymer composition (3) containing a copolymer (3) was prepared. The solids content of the copolymer composition (3) was 50%.

Example 4

In a 1000-mL glass separable flask equipped with a reflux condenser and a stirrer, pure water (169.2 g), 60% aqueous solution of propylene oxide 10 mol adduct of isoprenol-40 mol ethylene oxide adduct (hereinafter, referred to as 60% IPN40EO10PO) (350.0 g), and Mohr's salt (0.0056 g) were stirred while heating to 90° C. To the mixture, 80% AA (112.5 g), 15% NaPS (35.6 g), and 35% SBS (30.5 g) were separately added dropwise through different openings. The drop-wise addition times of 80% AA, 15% NaPS, and 35% SBS were 180 minutes, 210 minutes, and 180 minutes, respectively. The drop-wise addition of each solution was started at the same time. The temperature was controlled to 90° C. until the completion of drop-wise addition of 15% NaPS. The resulting solution was matured at the same controlled temperature for more 30 minutes after the completion of drop-wise addition of 15% NaPS and the polymerization was completed. After the completion of the polymerization, the reaction solution was left standing to be cooled and then was neutralized with 48% NaOH (95.8 g). Through these steps, a copolymer composition (4) containing a copolymer (4) was prepared. The solids content of the copolymer composition (4) was 45%.

Example 5

In a 500-mL glass separable flask equipped with a reflux condenser and a stirrer, pure water (24.0 g), 60% IPN10EO5PO (21.0 g), maleic acid (hereinafter, referred to as MA) (9.0 g), and Mohr's salt (0.0050 g) were stirred while heating to 90° C. To the mixture, 80% AA (22.5 g), 60% IPN10EO5PO (84.0 g), 15% NaPS (21.6 g), 35% SBS (0.6 g), and pure water (23.3 g) were separately added dropwise through different openings. The drop-wise addition times of 80% AA, 60% IPN10EO5PO, 15% NaPS, 35% SBS, and pure water were 180 minutes, 150 minutes, 210 minutes, 175 minutes, and 175 minutes, respectively. The drop-wise addition of each solution was started at the same time. The temperature was controlled to 90° C. until the completion of drop-wise addition of 80% AA. The resulting solution was matured at the same controlled temperature for more 60 minutes after the completion of drop-wise addition of 15% NaPS and the polymerization was completed. After the completion of the polymerization, the reaction solution was left standing to be cooled and then was neutralized with 48% NaOH (30.4 g). Through these steps, a copolymer composition (5) containing a copolymer (5) was prepared. The solids content of the copolymer composition (5) was 45%.

Example 6

In a 500-mL glass separable flask equipped with a reflux condenser and a stirrer, pure water (2.2 g), 60% IPN10EO5PO (92.5 g), MA (16.0 g), and 35% hydrogen peroxide (0.4 g) were stirred while heating to 60° C. To the mixture, 1.5% aqueous solution of L-ascorbic acid (hereinafter, referred to as 1.5% L-AS) (12.5 g) was added dropwise over 60 minutes. The temperature was controlled to 60° C. until the completion of drop-wise addition of 1.5% L-AS. The resulting solution was matured at the same controlled temperature for more 60 minutes and the polymerization was completed. After the completion of the polymerization, the reaction solution was left standing to be cooled and then was neutralized with 48% NaOH (20.7 g) and pure water (27.2 g). Through these steps, a copolymer composition (6) containing a copolymer (6) was prepared. The solids content of the copolymer composition (6) was 45%.

Comparative Example 1

In a 500-mL glass separable flask equipped with a reflux condenser and a stirrer, pure water (34.4 g) and Mohr's salt (0.0013 g) were stirred while heating to 70° C. To the mixture, 80% AA (35.0 g), 80% aqueous solution of ethylene oxide 25 mol adduct of isoprenol (hereinafter, referred to as 80% IPN25) (52.5 g), 15% NaPS (21.9 g), and 35% SBS (4.0 g) were separately added dropwise through different openings. The drop-wise addition times of 80% AA, 80% IPN25, 15% NaPS, and 35% SBS were 180 minutes, 120 minutes, 190 minutes, and 180 minutes, respectively. The drop-wise addition of each solution was started at the same time. The temperature was controlled to 70° C. until the completion of drop-wise addition of 15% NaPS. The resulting solution was matured at the same controlled temperature for more 30 minutes after the completion of drop-wise addition of 15% NaPS and the polymerization was completed. After the completion of the polymerization, the reaction solution was left standing to be cooled and then was neutralized with 48% NaOH (22.7 g). Through these steps, a comparative copolymer composition (1) containing a comparative copolymer (1) was prepared. The solids content of the comparative copolymer composition (1) was 45%.

Comparative Example 2

In a 1000-mL glass separable flask equipped with a reflux condenser and a stirrer, pure water (169.2 g) and 60% aqueous solution of ethylene oxide 50 mol adduct of isoprenol (hereinafter, referred to as 60% IPN50) (350.0 g), and Mohr's salt (0.0056 g) were stirred while heating to 90° C. To the mixture, 80% AA (112.5 g), 15% NaPS (35.8 g), and 35% SBS (30.7 g) were separately added dropwise through different openings. The drop-wise addition times of 80% AA, 15% NaPS, and 35% SBS were 180 minutes, 210 minutes, and 180 minutes, respectively. The drop-wise addition of each solution was started at the same time. The temperature was controlled to 90° C. until the completion of drop-wise addition of 15% NaPS. The resulting solution was matured at the same controlled temperature for more 30 minutes after the completion of drop-wise addition of 15% NaPS and the polymerization was completed. After the completion of the polymerization, the polymerization reaction solution was left standing to be cooled and then was neutralized with 48% NaOH (95.8 g). Through these steps, a comparative copolymer composition (2) containing a comparative copolymer (2) was prepared. The solids content of the comparative copolymer composition (2) was 45%.

The copolymer compositions (1) to (6) were analyzed by liquid chromatography to determine the amounts of the residual monomers, and the results revealed that the total amount of the residual monomers was less than 1000 ppm in each composition.

The copolymers (1) to (6) prepared in Examples 1 to 6 and the comparative copolymers (1) and (2) prepared in Comparative Examples (1) and (2) were evaluated for compatibility with surfactants as described below. Table 1 shows the results.

<Compatibility with Surfactant>

Detergent compositions each containing a test sample (polyalkylene glycol-based polymer or polyalkylene glycol-based polymer composition) were prepared using the following materials.

SFT-70H (polyoxyethylene alkyl ether, product of NIPPON SHOKUBAI Co., Ltd.): 40 g NEOPELEX F-65 (sodium dodecylbenzene sulfonate, product of Kao Corp.): 7.7 g (active ingredient: 5 g)

Kohtamin 86W (stearyl trimethylammonium chloride, product of Kao Corp.): 17.9 g (active ingredient: 5 g)

Diethanolamine: 5 g
Ethanol: 5 g
Propylene glycol: 5 g
Test sample: 1.5 g (based on solids content)
Ion exchange water: the amount of ion exchange water was appropriately adjusted such that the total amount of the detergent composition was 100 g based on the amount of the test sample.

The mixture was sufficiently stirred so that all the components were uniformly dispersed. Turbidity (kaolin turbidity, mg/l) of the mixture was evaluated by turbidity measured at 25° C. with a turbidimeter ("NDH2000", product of Nippon Denshoku Co., Ltd.).

The evaluation was based on the following criteria:

Good: Kaolin turbidity of not less than 0 and less than 50 (mg/l); phase separation, sedimentation, and turbidity were not visually observed.

Intermediate: Kaolin turbidity of not less than 50 and less than 200 (mg/l); slight turbidity was visually observed.

Bad: Kaolin turbidity of not less than 200 (mg/l); turbidity was visually observed.

TABLE 1

|  | Polymer | Composition (wt %) | Mw[1] | Compatibility |
|---|---|---|---|---|
| Example 1 | Copolymer (1) | [PN20EO5PO/AA = 40/60] | 11.000 | Good |
| Example 2 | Copolymer (2) | [PN20EO5PO/AA = 60/40] | 9.000 | Good |
| Example 3 | Copolymer (3) | [PN10EO5PO/AA = 70/30] | 10.000 | Good |
| Example 4 | Copolymer (4) | [PN40EO10PO/AA = 70/30] | 26.000 | Good |
| Example 5 | Copolymer (5) | [PN10EO5PO/AA/MA = 70/20/10] | 10.000 | Good |
| Example 6 | Copolymer (6) | [PN10EO5PO/MA = 78/22] | 36.000 | Good |
| Comparative Example 1 | Comparative copolymer (1) | [PN25/AA = 60/40] | 10.000 | Good |
| Comparative Example 2 | Comparative copolymer (2) | [PN50/AA = 70/30] | 20.000 | Good |

[1]Weight Average Molecular Weight

The copolymer (2) prepared in Example 2, the copolymer (5) prepared in Example 5, and the comparative copolymers (1) and (2) prepared in Comparative Examples 1 and 2 were evaluated for anti-soil redeposition ability as described below.

The anti-soil redeposition ratios of the copolymers (2) and (5) were 59.6% and 60.7%, respectively. The anti-soil redeposition ratios of the comparative copolymers (1) and (2) were 57.9% and 59.0%.

<Anti-Soil Redeposition Ability Test/Carbon Black>

An anti-soil redeposition ability test was performed with carbon black in the following procedure.

(1) Polyester cloth available from Test fabric was cut into 5 cm×5 cm white clothes. The degree of whiteness was determined for the white clothes by measuring the reflectance with a colorimetric color difference meter (SE2000, product of Nippon Denshoku Industries Co., Ltd.).

(2) Pure water was added to calcium chloride dihydrate (5.88 g) such that hard water (20 kg) was prepared.

(3) Pure water was added to polyethylene glycol (20) lauryl ether (8.0 g) such that a surfactant aqueous solution (100.0 g) was prepared.

(4) A targotmeter was set at 25° C. Hard water (2 L), the surfactant aqueous solution (5 g), 1.6% (based on solids content) polymer aqueous solution (5 g), and carbon black (0.50 g) were stirred for one minute in a pot at 100 rpm. Subsequently, seven white cloths were put into the mixture, and the mixture was stirred for ten minutes at 100 rpm.

(5) The white cloths were wringed by hand, and the hard water (2 L) at 25° C. was poured into the pot and stirred at 100 rpm for two minutes.

(6) The white clothes were ironed with a cloth thereon to dry them while wrinkles were smoothed. The clothes were measured again for reflectance as whiteness with the colorimetric difference meter.

(7) The anti-soil redeposition ratio is determined from the following formula, based on the measurement results.

Anti-soil redeposition ratio (%)=(whiteness of white cloth after washed)/(whiteness of original white cloth)×100

The results of Examples and Comparative Examples indicate a trend showing high compatibility with surfactants and high anti-soil redeposition ability in hard water of the polyalkylene glycol-based polymer essentially containing the structure unit (a) derived from the polyalkylene glycol-based monomer (A) and the structure unit (b) derived from the carboxyl group-containing monomer (B) wherein the structure unit (a) is present at a level of 1 to 90% by mass, and the structure unit (b) is present at a level of 10 to 99% by mass.

The invention claimed is:

1. A polyalkylene glycol-based polymer comprising: a structure unit (a) derived from a polyalkylene glycol-based monomer (A); and
a structure unit (b) derived from a carboxyl group-containing monomer (B);
the polyalkylene glycol-based monomer (A) represented by the formula (1):

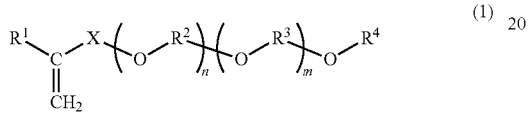

(1)

wherein $R^1$ represents H or a methyl group; X represents a methylene group, an ethylene group, or a direct bond; n represents an average addition number of moles of an oxyalkylene group ($-R^2-O-$), and is from 1 to 300; $R^2$ represents an ethylene group; m represents an average addition number of moles of an oxyalkylene group ($-R^3-O-$), and is from 3 to 10; $R^3$ represents a $C_{3-4}$ alkylene group, and each of $R^3$s may be the same as or different from each other; and $R^4$ represents H, a $C_{1-24}$ alkyl group, or a $C_{6-24}$ aryl group,
wherein the structure unit (a) is present at a level of from 10 to 70% by mass based on 100% by mass of all structure units derived from all monomers in the polymer, and
the structure unit (b) is present at a level of from 30 to 90% by mass based on 100% by mass of all the structure units derived from all the monomers in the polymer, and
wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 1 to 90 mol %.

2. The polyalkylene glycol-based polymer according to claim 1, wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 3 to 80 mol %.

3. The polyalkylene glycol-based polymer according to claim 1, wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 5 to 50 mol %.

4. The polyalkylene glycol-based polymer according to claim 1, wherein the polyalkylene glycol-based polymer is produced by using a persulfate, a sulfurous acid (sulfite), and a heavy metal ion.

5. The polyalkylene glycol-based polymer according to claim 4, wherein 0.5 to 5 parts by mass of the sulfite are used with respect to 1 part by mass of the persulfate.

6. A process for producing a polyalkylene glycol-based polymer, comprising polymerizing a polyalkylene glycol-based monomer (A) and a carboxyl group-containing monomer (B),
the polyalkylene glycol-based monomer (A) represented by the formula (1):

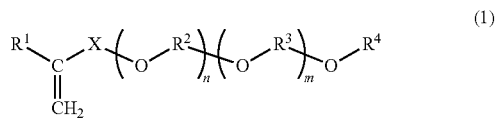

(1)

wherein $R^1$ represents H or a methyl group; X represents a methylene group, an ethylene group, or a direct bond; n represents an average addition number of moles of an oxyalkylene group ($-R^2-O-$), and is from 1 to 300; $R^2$ represents an ethylene group; m represents an average addition number of moles of an oxyalkylene group ($-R^3-O-$), and is from 3 to 10; $R^3$ represents a $C_{3-4}$ alkylene group, and each of $R^3$s may be the same as or different from each other; and $R^4$ represents H, a $C_{1-24}$ alkyl group, or a $C_{6-24}$ aryl group,
wherein the polyalkylene glycol-based monomer (A) is added at a level of from 10 to 70% by mass based on 100% by mass of all monomers to be added, and
the carboxyl group-containing monomer (B) is added at a level of from 30 to 90% by mass based on 100% by mass of all the monomers to be added, and
wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 1 to 90 mol %.

7. The process for producing a polyalkylene glycol-based polymer according to claim 6, wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 3 to 80 mol %.

8. The process for producing a polyalkylene glycol-based polymer according to claim 6, wherein out of 100 mol % of all the oxyalkylene groups represented by ($-R^2-O-$) and ($-R^3-O-$) in the formula (1) in the polyalkylene glycol-based monomer (A), $C_{3-4}$ oxyalkylene groups constitute 5 to 50 mol %.

9. The process for producing a polyalkylene glycol-based polymer according to claim 6, wherein the polyalkylene glycol-based polymer is produced by using a persulfate, a sulfurous acid (sulfite), and a heavy metal ion.

10. The process for producing a polyalkylene glycol-based polymer according to claim 9, wherein 0.5 to 5 parts by mass of the sulfite are used with respect to 1 part by mass of the persulfate.

* * * * *